United States Patent [19]

Siebold et al.

[11] 3,861,761
[45] Jan. 21, 1975

[54] TRAILER BRAKE CONTROL VALVE FOR DUAL-CIRCUIT PNEUMATIC BRAKES OF ROAD VEHICLES

[75] Inventors: Manfred Siebold, Boblingen; Siegfried Beck, Stuttgart, both of Germany

[73] Assignee: Robert Bosch GmbH, Stuttgart, Germany

[22] Filed: Sept. 18, 1973

[21] Appl. No.: 398,545

[30] Foreign Application Priority Data
Sept. 21, 1972 Germany.............................. 2246236

[52] U.S. Cl..................................... 303/52, 303/7
[51] Int. Cl............................................. B60t 15/06
[58] Field of Search........................... 303/7, 52–54, 303/40

[56] References Cited
UNITED STATES PATENTS

| | | | |
|---|---|---|---|
| 3,240,534 | 3/1966 | Stelzer.............................. | 303/40 X |
| 3,443,841 | 5/1969 | Kobnick........................... | 303/40 X |
| 3,525,555 | 8/1970 | Meyer et al....................... | 303/40 |

*Primary Examiner*—Duane A. Reger
*Attorney, Agent, or Firm*—Michael S. Striker

[57] ABSTRACT

A first piston is displaceable in a housing and has a first piston portion having a larger effective surface and movable in one direction. A second piston portion normally disengaged from the first piston portion has a smaller effective surface and is moveable in an opposite direction into operative engagement with the first piston portion. The second piston is spaced from and defines with the first piston portion a chamber. A first inlet communicates with this chamber and is at the pressure prevailing in a first hydraulic brake circuit. A second inlet communicates with a smaller effective surface of the second piston portion and is at the pressure prevailing in a second hydraulic brake circuit. A biasing arrangement biases the second piston portion in the aforementioned one direction until the pressure upon the smaller effective surface exceeds the biasing force so that the second piston portion moves in the opposite direction into operative engagement with the first piston portion, with the result that the force acting upon the first piston portion urging the same in the one direction is reduced to the differential of the forces acting upon the effective surfaces of the two piston portions. A third inlet is subject to the pressure prevailing in a trailer brake circuit, and a third feedback piston is connected with the second piston to resist movement thereof in the opposite direction and has a reaction surface exposed to the pressure of the third inlet and so dimensioned that the force acting upon it is substantially equal to the aforementioned differential.

5 Claims, 1 Drawing Figure

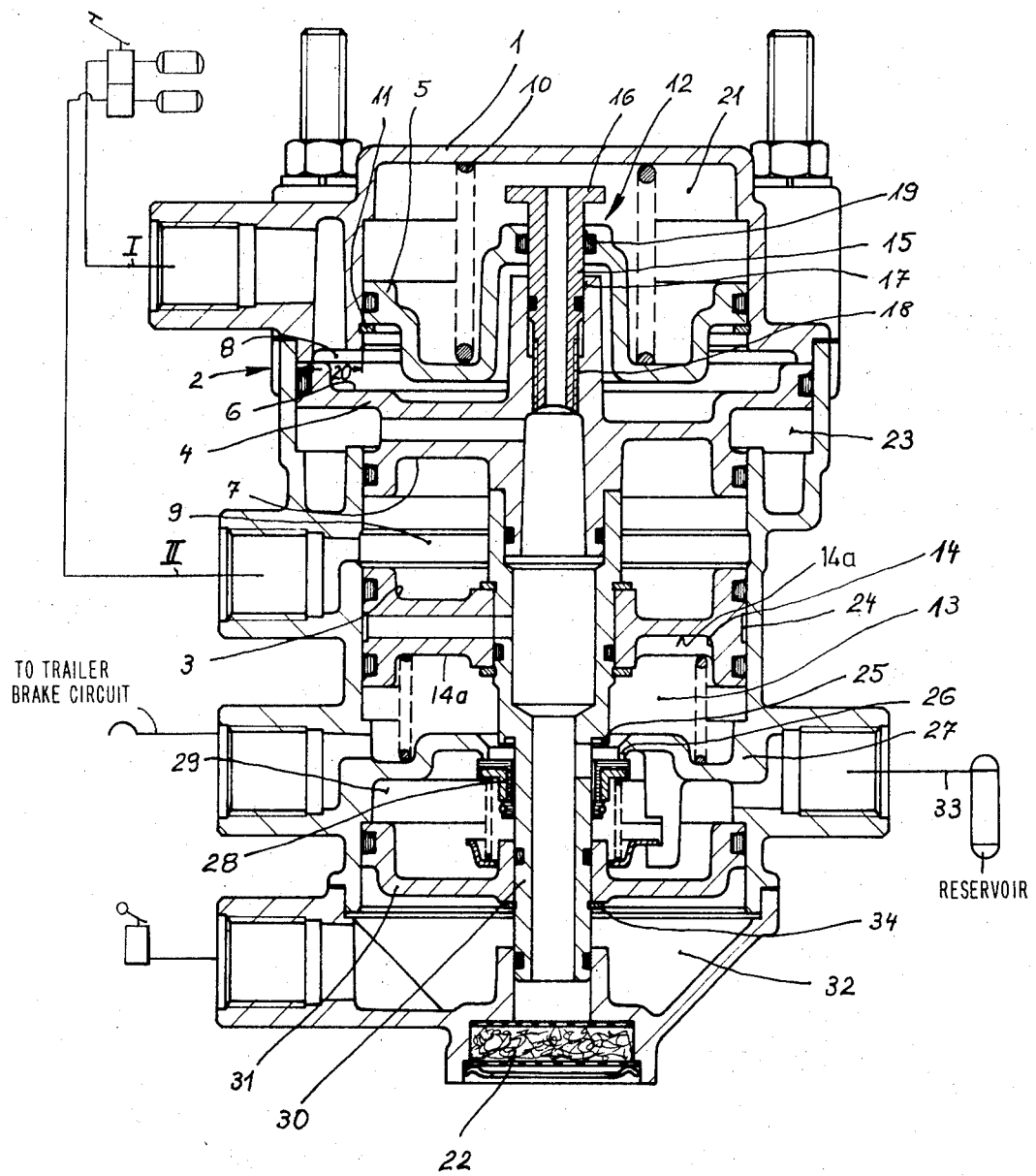

ated pressure in the trailer brake circuit, and a third feedback piston is connected with the second piston to resist movement thereof in the opposite direction and has a reaction surface which is exposed to the pressure in the third inlet and so dimensioned that the force acting upon it substantially equals the differential.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

The single FIGURE is an axial section through a brake control valve according to the present invention.

DESCRIPTION OF THE PREFERRED EMBODIMENTS

Discussing the drawing now in detail, it will be seen that the novel trailer brake control valve depicted therein has a housing 1 in the upper portion of which two brake pistons 2 and 3 are arranged and displaceable. One of these pistons, here the one identified with reference numeral 2, has a first piston portion 4 of larger effective surface area, and a second piston portion 5 having a smaller effective surface area and acting opposite to the operation of the first piston portion 4.

The first piston portion 4 is a stepped piston and has a larger effective surface 6 which is subjected to the pressure prevailing in an inlet I which communicates with a first pneumatic brake circuit of a dual-circuit pneumatic braking arrangement of a road vehicle. In addition, it has a smaller effective surface 7 which is exposed to the pressure prevailing in the inlet I which communicates with the second pneumatic brake circuit of the dual-circuit braking arrangement of the vehicle. The inlet I communicates with a pressure chamber 8, and the inlet II with a pressure chamber 9, which is bonded at the opposite sides by the piston portion 4, and the piston 3, respectively.

As the drawing shows, the second piston portion 5 has an outer diameter which is approximately equal to that of the second piston 3, and to the smaller step or part of the first piston portion 4. It is subjected to the force of a compressed spring 10, which normally maintains the piston portion 5 in engagement with an abutment 11 on the housing 1, in which the piston portion 5 is inoperative. The piston portion 5 is connected with the piston portion 4 via a connecting arrangement 12 which permits relative axial movement of the piston portions. In other words, the piston portions 4 and 5 will be coupled in operative engagement only if and when the piston portion 5 moves upwardly in the drawing with reference to the piston portion 4 until it engages the abutment 16 provided on the arrangement 12, at which time the operative engagement is established due to the fact that the arrangement 12 has its hollow stem threaded with an externally threaded portion 18 thereof into a tapped bore of the piston portion 4. A seal 19 seals the piston portion 5 with respect to the outer cylindrical portion 17 of the stem 15, so that the piston portion 5 can slide along this cylindrical portion 17.

When the piston portion 5 moves upwardly in the drawing, into engagement with the abutment 16 and in opposition to the force exerted by the spring 10, then the two piston portions 4 and 5 are operatively coupled and only the differential surface 20 remains as the effective surface. This differential surface 20 has a surface area which corresponds to the reaction surface 14a of a feed-back piston 14 located in a pressure varying chamber 13 and arranged at the reverse side of the piston rod with which it is of one piece in the illustrated embodiment. Of course, it could be a separate member and connected with the piston 3. In any case, the pistons 3 and 14 are of identical diameter.

From what has been set forth earlier, it will be appreciated that a rigid coupling becomes established between the piston portions 4 and 5 when a certain pressure level of the primary brake circuit pressure acting upon the piston portion 5 through the inlet I is exceeded, that is when this pressure becomes sufficient to overcome the force of the spring 10 and to move the piston portion 5 against the abutment 16. Once this has taken place, only the pressure acting upon the differential surface 20 of the two piston portions 4 and 5 is active in the valve operating direction.

The chamber 21 accommodates the spring 10 and is in communication with an inlet 22 which is to be connected with the ambient atmosphere, through the hollow shaft 15. A chamber 23 between the two stages of the first piston portion 4 and the chamber 24 between the pistons 3 and 14, are also both connected with the ambient atmosphere, via the inlet 22.

The feed-back piston 14 carries an outlet valve seat 25, and a wall 27 of the housing 1 is provided with an inlet valve seat 26. A valve body 28 cooperates with the valve seats 25 and 26 and is located in a chamber 29 which is at the pressure of a fluid reservoir, that is of the pneumatic reservoir for the brake circuit. The components 25, 26 and 28, constitute a double-seat valve 25, 26,28.

A tubular member 30 is fixedly connected with the valve seat 25, and carries a piston member 31, the opposite piston surfaces of which are exposed to the pressure in the chamber 29 on the one hand, and to the pressure in a chamber 32 which communicates with a safety brake circuit. In the direction in which the pressure of the chamber 29 acts upon it, the piston member 31 cannot slide with reference to the tubular member 30, such movement being precluded by a circlip 34. In the opposite direction, however, the piston member 31 can shift relative to the tubular member 31 so that the piston member 30 does not have to move during each operation of the outlet valve seat 25 by the pistons 2 or 3, and so that the operation can take place without having to overcome significant counterforces. A similar relationship exists between the piston portion 4 and the piston 3 which, in the position illustrated in the drawing, can move away from one another but not towards one another.

In operation of the brake control valve described with reference to the drawing, and assuming that the brake is released, the inlets I and II communicating with the respective pneumatic brake circuits are not under pressure. The two pistons 2 and 3 are in their upper end positions. The inlet 33 which communicates with the trailer brake circuit, is also not under pressure because the trailer brake circuit is vented via the chamber 13, the open outlet valve 25, 28 and an opening in the wall of the tubular member 30. In this condition, the trailer brake valve is not activated.

Assuming that the brake system is fully functional, that is both of the pneumatic brake circuits communicating with the inlets I and II are operative, then pressure develops in both of these circuits, and consequently in the inlets I and II as soon as a braking incident takes place. In this case, the chambers 8 and 9 are subjected to the respective pressure and, because the effective surface 6 is larger than the effective surface 7 and the piston portion 5 is initially ineffective, a force which in the drawing acts downwardly prevails in the beginning. This causes the outlet valve composed of the components 25 and 28 to close, and the inlet valve composed of the components 26 and 28 to open. In consequence, pressure fluid can pass from the chamber 29 into the chamber 13 and flow into the outlet 33 and from there into the fluid reservoir. The large effective piston surface 6 assures that the valve 25, 26, 28 will switch over from one to the other position even when the pressure increase is relatively low, so that braking of the trailer can be controlled in stages even in this first phase of operation.

After a first relatively steep pressure increase in the inlet 33 which communicates with the fluid reservoir, a further pressure increase at the primary side results in the pressure exceeding a limit at which it is capable of overcoming the force exerted by the biasing spring 10. The piston portion 5 is now displaced in the opposite direction from the piston portion 4, until it moves into engagement with the abutment 16 so that the piston portions 4 and 5 are now coupled with one another. This means that only the differential surface 20 of the piston portions 4 and 5 is now effective for the pressure to urge the coupled piston portions 5 and 4 in the braking direction. Since this differential surface 20 is equal to the reaction surface 14a of the piston 14, the pressure in the trailer brake circuit now increases substantially at the same ratio as the primary pressure so that the pressure build-up in the trailer brake circuit, which initially rose more rapidly than the pressure build-up in the dual pneumatic brake circuits of the road vehicle towing the trailer, is now terminated. It will be appreciated that this initially more rapid buildup is desired in order to assure that the trailer will undergo a certain amount of braking action before the braking action via the brakes of the road vehicle becomes effective, to prevent the trailer from pushing the road vehicle. If the rise of pressure in the trailer brake circuit, were plotted as a curve, the latter would be seen to have an initial steep rise leading to a point at which the steep rise is interrupted and the curve continues at an upward angle of only about 45°.

The piston member 31 does not participate in the movement of the outlet valve seat 25 and the tubular member 30, connected with the same because the tubular member 30 can slide downwardly (in the drawing) through the piston member 31. In this phase of operation of the valve an excellent stepping or staging of the pressure supplied into the trailer brake circuit is also assured. When the primary pressure in the inlets I and II decreases, all movable valve parts return to their starting position.

It is possible to adjust the arrangement 12 simply by turning the stem 15 to move the abutment 16 closer to or farther from the piston portion 5. Since this changes the extent to which the spring 10 is compressed when the piston portion 5 moves into engagement with the abutment 16, such an adjustment will also vary the position of the point on the aforementioned pressure curve at which the initially steep pressure increase in the inlet 33 will change to the more gradual pressure increase.

In the event that the pneumatic brake circuit communicating with the inlet II should become defective, the valve according to the present invention will continue to operate in the manner described above.

In the contrary event that the pneumatic brake circuit communicating with the inlet I should become defective, rather than that communicating with the inlet II, then the pressure in the trailer brake circuit will rise uniformly from the moment the valve is actuated, and no change will occur in the uniformity of this increase. When the valve switches, the piston portion 4 and the piston 3 will move apart. The same is true when the emergency brake circuit should become actuated as a result of a pressure decrease in the chamber 32 with which it communicates. In this case also, the pressure in the inlet 33 will increase uniformly.

If desired, it is possible to make the piston 3 of two piston parts, analogously to the piston 2. In such a case the initially steep increase, followed by a more gradual increase of pressure in the inlet 33 communicating with the fluid reservoir, would be maintained even if the pneumatic brake circuit communicating with the inlet I should become defective, just as is the case with the illustrated embodiment, when the circuit communicating with inlet II becomes defective.

It will be understood that each of the elements described above, or two or more together, may also find a useful application in other types of constructions differing from the types described above.

While the invention has been illustrated and described as embodied in a trailer brake control valve actuated by dual-pneumatic brake circuits of road vehicles, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that from the standpoint of prior art, fairly constitute essential characteristics of the generic of specific aspects of this invention and, therefore, such adaptations should and are intended to be comprehended within the meaning and range of equivalence of the following claims.

What is claimed as new and desired to be protected by letters Patent is set forth in the appended claims.

1. In a trailer brake control valve actuated by dual pneumatic brake circuits of road vehicles, a combination comprising a housing; a first piston displaceable in said housing and comprising a first piston portion having a larger effective surface and being movable in one direction, and a second piston portion normally disengaged from said first piston portion and having a smaller effective surface, said second piston portion being movable in an opposite direction into operative engagement with said first piston portion; a second piston spaced from and defining with said first piston portion a chamber, said second piston being movable in said opposite direction; a first inlet communicating with said chamber and being under pressure prevailing in a first hydraulic brake circuit; a second inlet communicating with said smaller effective surface of said second piston portion and being under the pressure prevailing in a second hydraulic brake circuit; biasing means biasing said second piston portion in said one direction until pressure upon said smaller effective surface exceeds the biasing force of said biasing means so that said second piston portion moves in said opposite direction into operative engagement with said first piston portion, so that the force acting upon said first piston portion and urging the same in said one direction is reduced to the differential of the forces acting upon said effective surfaces; a third inlet subject to the pressure prevailing in a trailer brake circuit; and a third feed-back piston connected with said second piston to resist movement thereof in said opposite direction and having a reaction surface which is exposed to said pressure in said third inlet and so dimensioned that the force acting upon it substantially equals said differential.

2. A combination as defined in claim 1; and further comprising mounting means connected and movable with said first piston portion and mounting said second piston portion for movement relative to said first piston portion in said opposite direction through a predetermined distance, and including abutment means engaged by said second piston portion upon movement of the same through said distance so that said second piston portion becomes operatively engaged with said first piston portion.

3. A combination as defined in claim 2; and further comprising means for varying said distance.

4. A combination as defined in claim 1; further comprising a tubular member connected and movable with said third piston; and a piston member surrounding said tubular member and having a first and an oppositely directed second piston member surface which are respectively exposed to the pressure of a hydraulic-fluid reservior and of a safety-brake circuit.

5. A combination as defined in claim 4; and further comprising means preventing movement of said piston member relative to said tubular member in direction from said first toward said second piston member surface, but permitting such movement in direction from said second toward said first piston member surface.

* * * * *